June 12, 1956   H. C. SIMONS   2,749,829
VEHICLE HEATER-VENTILATOR APPARATUS
Filed June 27, 1952   2 Sheets-Sheet 1
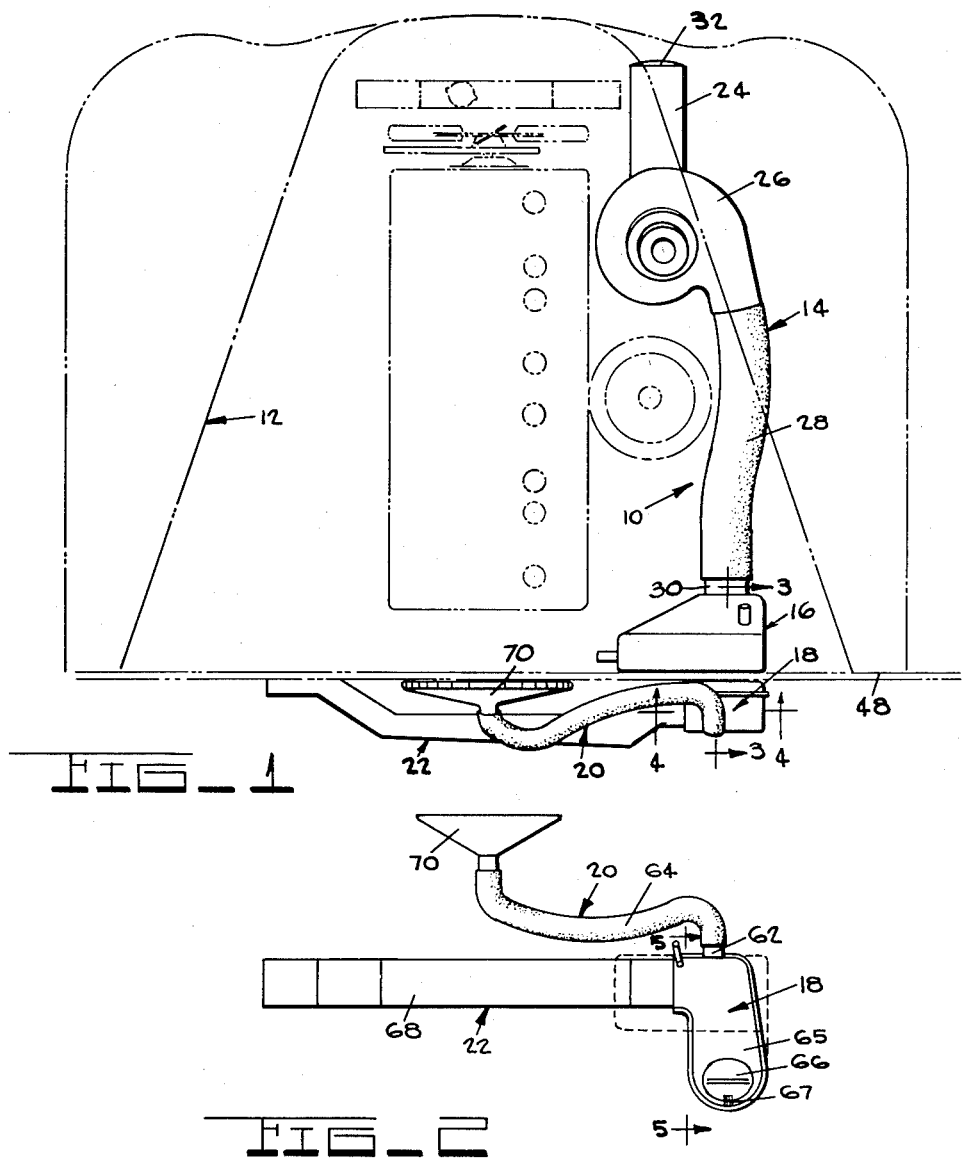
INVENTOR.
HOMER C. SIMONS
BY
ATTORNEYS

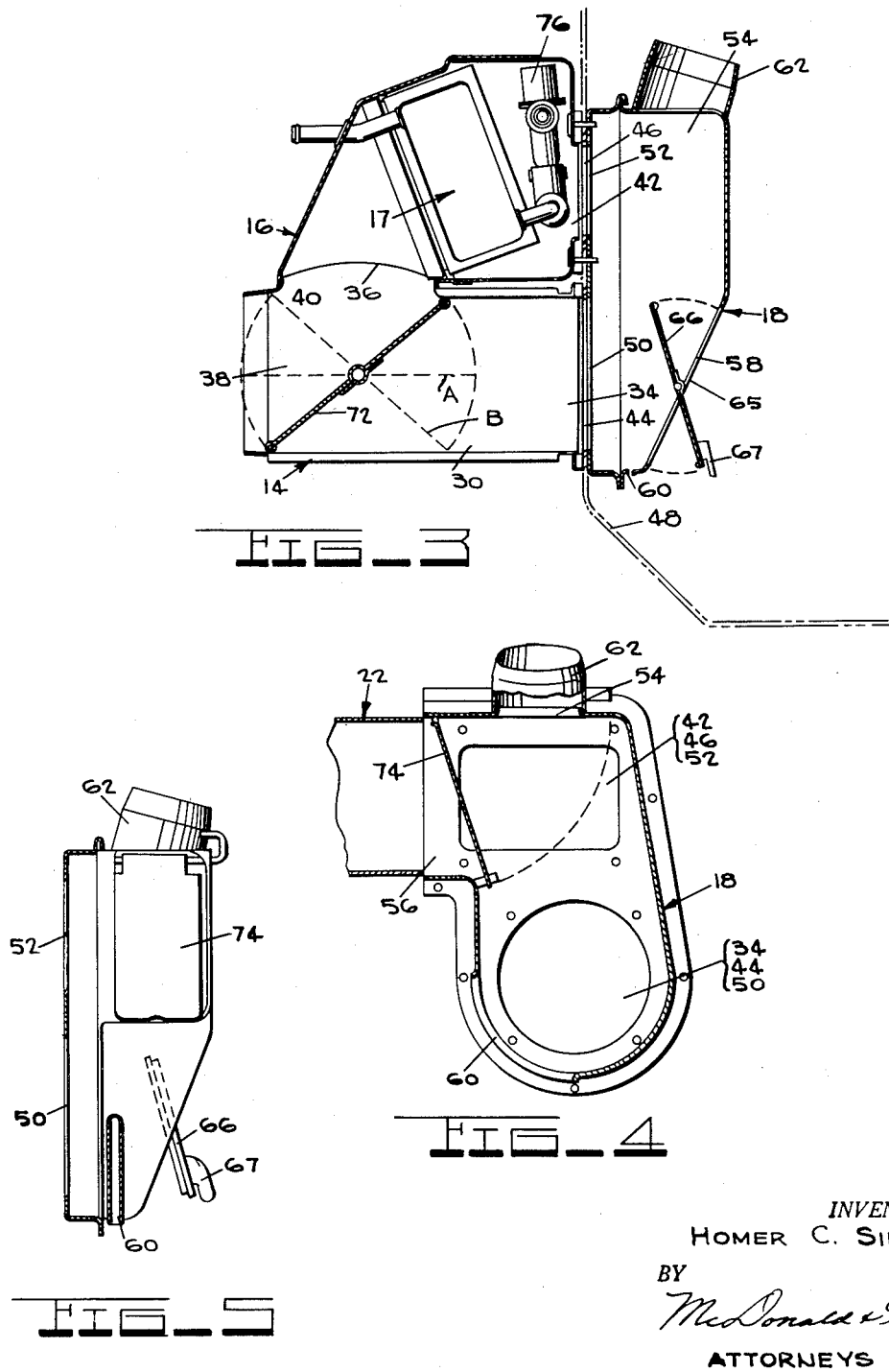

United States Patent Office 2,749,829
Patented June 12, 1956

2,749,829

VEHICLE HEATER-VENTILATOR APPARATUS

Homer C. Simons, South Euclid, Ohio, assignor to Eaton Manufacturing Company, Cleveland, Ohio, a corporation of Ohio Application June 27, 1952, Serial No. 295,905

8 Claims. (Cl. 98—2)

This invention relates to automotive vehicle heating and ventilating apparatus and more particularly to appropriate ducting and control therefor.

Broadly the invention comprehends the provision of an automotive heating and ventilating apparatus that provides for the controlled supply of fresh heated or unheated air directly to the vehicle windshield or the passenger compartment. This is achieved through the provision of fresh air inlet ducting, by-pass ducting connected thereto having heater means therein and air outlet ducting connected at the outlet of the inlet and by-pass ducting providing communication therebetween. Valve means arranged in the inlet ducting at the point of connection of the inlet ducting and by-pass ducting provide for the flow of fresh air either wholly or partially through the by-pass ducting or substantially through the inlet ducting from the inlet to outlet side thereof. Other valve control means appropriately arranged in the outlet ducting provide for the desired volume flow of heated or unheated air, as the case may be, to either the windshield or passenger compartment of the vehicle. The outlet ducting as arranged in communication between the outlet of the by-pass and inlet ducting provides particularly for full volume unhindered unheated fresh air windshield defogging or defrosting which has not heretofore been possible with conventionally utilized automotive vehicle heating and ventilating systems.

Among the several objects of the invention is the provision of a heater-ventilator apparatus for automotive vehicles, that;

1. Provides for unhindered unheated fresh air passage for controlled delivery to either the windshield or passenger compartment of the vehicle;
2. Provides for heated fresh air passage for controlled delivery to either the windshield or passenger compartment of the vehicle;
3. Communicates the heated and unheated fresh air outlet passages for the subsequent admixed discharge of the fresh air to either the windshield or passenger compartment of the vehicle;
4. Provides for the delivery of heated or unheated air to the passenger compartment by virtually the same path once it is discharged into the outlet ducting of the apparatus;
5. Provides simple control means for a desired heated or unheated delivery of air to either the windshield or passenger compartment of the vehicle; and
6. Utilizes air impelling means for forcing the fresh air under pressure through the apparatus.

Other objects and advantages of the invention will appear from the following description taken in connection with the drawings forming a part of the specification, and in which:

Fig. 1 is a top elevation view of a combination heating and ventilating apparatus as applied to an automotive vehicle;

Fig. 2 is a front elevation view of the heating and ventilating apparatus of Fig. 1 as viewed from the passenger compartment of the vehicle;

Fig. 3 is a cross-sectional view of a portion of the heater-ventilator apparatus of Figs. 1 and 2 taken substantially along lines 3—3 of Fig. 1;

Fig. 4 is a fragmentary cross-sectional view taken substantially along lines 4—4 of Fig. 1; and Fig. 5 is a cross-sectional view taken substantially along lines 5—5 of Fig. 2.

Similar reference characters indicate corresponding parts throughout the several views of the drawings.

Referring to the drawings for more specific details of the invention 10 represents generally an automotive vehicle heating and ventilating apparatus as applied, to automotive vehicles illustrated in part by outline 12, comprising fresh air inlet ducting or air conducting means 14, a by-pass ducting 16, an air receiving housing 18, windshield air delivery means 20, and passenger compartment air distributor 22.

Fresh air ducting 14 includes an air intake duct 24, a blower shroud 26, a flexible duct 28, and a duct 30 all connected in series so as to provide communication between air inlet end 32 in duct 24, and air outlet or discharge end 34 in duct 30. An appropriate blower wheel, not shown, is housed in shroud 26 effective to impel air under pressure through ducting 14.

By-pass ducting 16 has an air heating device in the form of a hot water heater core 17 disposed appropriately therein whereby air as it passes through the ducting 16 comes in contact with said heated surface of the core and becomes heated. The inlet end 36 of the ducting 16 is in communication with passage 38 in duct 30 by way of an opening 40 in the wall of duct 30 whereas the outlet end 42 of ducting 16 lies in a like plane with outlet end 34 in duct 30.

The outlet ends 34 and 42 of the respective duct 30 and ducting 16 communicate with the interior of housing 18 by way of appropriate openings 44 and 46 in the dashboard 48 of the vehicle and openings 50 and 52 in the housing. Openings 44 and 50 are associated with outlet end 34 of duct 30 and openings 46 and 52 are associated with outlet end 42 of ducting 16. As will be noted from Figs. 1 and 3 the duct 30 and ducting 16 are arranged, on one side of the dashboard 48, within the engine compartment whereas the housing is arranged, on the dashboard, oppositely disposed to duct 30 and ducting 16, within the passenger compartment.

The air receiving housing 18 has appropriately arranged in the surface thereof air outlets 54, 56, 58 and 60. Air outlet 54 communicates through duct 62 with a flexible hose 64 of the windshield air delivery means whereas outlet 56 which is substantially arranged at 90° to outlet 54 communicates with passenger compartment air distributor 22. Outlet 58 is arranged in an angular wall 65 of housing 18, providing for the discharge of air therethrough in a downward direction toward the floor of the vehicle, said outlet 58 being appropriately controlled by a pivotal valve 66 for the desired volume flow of air therethrough. Valve 66 is adapted to be manually operated by merely moving said valve about its pivot axis through the engagement of handle 67 provided on the face of the valve. Outlet 60 is to be classed as a high pressure opening permitting of the constant flow of a low volume high pressure stream of air toward the vehicle floor and in a direction to the left within the passenger compartment.

Air distributor 22 likewise as the housing 18 to which it is connected is located in the passenger compartment and appropriately supported on the dashboard whereby through outlet openings arranged in its lower edge 68 it can supply fresh air across the greater width of the passenger compartment and thus evenly distribute said air to the passenger compartment.

A windshield air distributor 70 forms part of means 20 and by way of air communication with flexible hose 64 delivers air directly to the windshield of the vehicle.

Whereas an air control valve 72 pivotally arranged in duct 30 adjacent the communication between duct 30 and ducting 16 controls the fresh air delivered to duct 30 for subsequent delivery either wholly or partially to ducting 16 or substantially wholly, partially or not at all through duct 30 to the outlet end 34 thereof, valve 74 controls the air delivered to housing 18 which is not discharged through openings 58 or 60 for subsequent delivery to either the windshield air delivery means 20 or air distributor 22. Valve 74 as illustrated by Figs. 4 and 5 is pivotal about an axis arranged near the top wall of housing 18, substantially at the junction of the walls of the housing in which the openings 54 and 56 are located, so as to be movable to a position to substantially cut off air delivery to either means 20 or distributor 22 when at opposite limits of its movement, or to proportion the flow between means 20 and distributor 22 through the movement thereof between its end limits.

Valve 72 in addition to being movable to dotted line position A for effecting a passage of unheated air in substantially unhindered path through the fresh air inlet ducting 14 and all positions intermediate position A and the position shown by Fig. 3, is movable to position B to close off the delivery of any fresh air through the heating and ventilating apparatus 10. This positioning B of valve 72 is used when it is desirable to shut off obnoxious odors which might otherwise enter the passenger compartment.

A thermostatic valve 76 of the conventionally used Ranco type is appropriately arranged in a connection of the heater core 17 adjacent thereto as a simple construction for effectively controlling the desired water temperature of the core.

If in the use of the heating and ventilating apparatus 10, it is desired to obtain the delivery of heated air in the housing 18, the valve is maintained in the position shown by Fig. 3 whereby with the heater core carrying heated water the air passing through ducting 16 extracts heat therefrom and discharges it into housing 18. After the heated air is received in housing 18 it can be directed for flow therefrom as desired, that is, it can be made to substantially all flow to either the windshield by way of the windshield air delivery means 20 or to the passenger compartment by way of distributor 22 or be proportionately distributed therebetween through the appropriate manipulation of valve 74. With the valve 74 in the position shown by Fig. 4 and with the valve 66 closed, substantially all of the air received by housing 18 is discharged by way of windshield air delivery means 20 to the windshield whereas with the valve 74 moved to its other extreme position and with valve 66 closed, substantially all of the air received by housing 18 is discharged by way of distributor 22 to the passenger compartment. A positioning of valve 74 between its two extreme limits of movement will proportion the flow to the distributor 22 and the air delivery means 20. Valve 66 is adapted to be opened if it is desired to have air discharged from housing 18 directly into the passenger compartment without need for its delivery thereto by way of distributor 22. When valve 66 is so opened it is obvious that due to the low resistance to movement of air through such a large opening the distributor 22 and air delivery means 20 are virtually entirely robbed of all air that might otherwise be delivered thereto.

When it is desired to obtain the delivery of unheated air to housing 18, for the subsequent delivery therefrom as aforesaid, the valve 72 is pivoted to dotted line position A whereupon the air passes directly in a straight line of flow through duct 30, to housing 18, from its inlet to outlet ends.

In addition to the fact that the inlet of intake duct 24 is so desirably positioned toward the front of the vehicle as shown by Fig. 1 for the purpose of easily intaking ram air for subsequent delivery to the interior of the vehicle, the blower arranged in blower shroud 26 can be operated to boost the delivery of air to thereby effectively heat or ventilate the interior of the vehicle according to the desired selected operation of the apparatus.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. In a heating and ventilating apparatus for vehicles, air ducting having an air inlet at one end and an air outlet at its opposite end, a second air ducting having an air inlet and an air outlet, said air inlet of the second ducting having air communication with the first ducting intermediate the air inlet and air outlet ends of the first ducting, an air receiving housing having inlet opening in direct communication with the air outlets of both ductings and a plurality of air outlets, two of which are located side by side, in adjacent wall portions of said housing a three position valve in the first air ducting adjacent said intermediate opening for controlling flow of air through said ductings, a heat exchanger in the second ducting, and a valve in the housing for controlling the flow of air through said side by side air outlets of the housing.

2. Apparatus according to claim 1 wherein the outlets of the ductings lie in substantially the same plane and are arranged in communication with the housing on the vehicle dashboard with the ductings arranged in the vehicle engine compartment and the housing in the passenger compartment.

3. Apparatus according to claim 1 wherein the three position valve is adaptable in one position to cut off direct communication between the first ducting air inlet and outlet, in a second position to cut off direct communication between the first ducting air inlet and outlet and between the first ducting air inlet and a second ducting inlet, and in a third position to permit substantially unobstructed air flow between the first ducting air inlet and outlet, and wherein the valve in the housing is adaptable in one position to substantially cut off air flow through one housing outlet, in a second position to substantially cut off air flow through a second housing outlet lying side by side to the first outlet and in positions between said side by side outlets to proportionate the flow therethrough.

4. Apparatus according to claim 3 wherein the housing includes a side wall having one of the outlets therein, a top wall connected adjacent the side wall having another of the outlets therein, and a front wall having another of the outlets therein, said valve in the housing being pivoted to control flow of air through the outlets in the top and side walls of the housing and a valve pivotal in the outlet in the front wall of the housing for controlling the flow of air therethrough.

5. Apparatus according to claim 4 wherein the valve for controlling the flow of air through the outlets in the top and side walls is pivotally supported for pivotal movement substantially at the connected juncture of said top and side walls and is movable approximately 90° between said walls.

6. Apparatus according to claim 5 wherein the front wall includes an angular portion having the outlet therein directed in downward open array and wherein the valve for control of air flow therethrough is pivotal substantially in the plane of said opening.

7. Apparatus according to claim 5 wherein air impeller means are arranged in the first mentioned ducting forward of the communication of the first mentioned ducting with said second ducting and said valve in the first mentioned ducting for impelling air through the apparatus.

8. In a heating and ventilating apparatus for vehicles comprising ducting having air inlet and outlet openings at opposite ends thereof and an air outlet intermediate the ends, a second ducting connected to the first ducting having air inlet and outlet openings at opposite ends thereof with its inlet opening registering with the intermediate outlet in the first ducting providing communication therebetween, air impeller means arranged in the first ducting between the air inlet and intermediate outlet openings thereof, a heat exchanger arranged in the second ducting intermediate its end openings, an air receiving housing having air inlet openings therein connected to the ductings in air receiving communication therewith by way of the outlet openings therein, said housing having a plurality of air outlets, a passenger compartment air distributor, connected to the housing in communication therewith by way of one of the outlet openings in the housing, adapted to be arranged substantially in horizontal extended fashion on the dashboard of the vehicle in the passenger compartment of the vehicle and having a downwardly directed outlet opening, a windshield air distributing means connected to the housing in communication therewith by way of another outlet opening in the housing, a valve pivotally supported in the first ducting near the communication between the first and second ductings positionable for directing substantially all the air, taken in at the inlet opening of the first ducting, to the second ducting or for delivery through the first ducting outlet opening or for inhibiting substantially all air flow to either the second ducting or outlet opening of the first ducting, and a valve pivotally supported in the housing intermediate the outlet openings in the housing communicating with the air distributor and the windshield distributing means for movement intermediate the outlet openings in the housing providing communication between the housing and the respective air distributor and windshield air distributing means, for the effective control of air flow therethrough.

References Cited in the file of this patent

UNITED STATES PATENTS

| | | |
|---|---|---|
| 1,966,882 | Bucklen | July 17, 1934 |
| 2,001,878 | Johnson | May 21, 1935 |
| 2,116,145 | Findley | May 3, 1938 |
| 2,158,741 | Christman | May 16, 1939 |
| 2,237,452 | Samuels et al. | Apr. 8, 1941 |
| 2,309,202 | Moore | Jan. 26, 1943 |
| 2,325,427 | Reynolds | July 27, 1943 |
| 2,391,408 | Galamb et al. | Dec. 25, 1945 |
| 2,445,392 | Findley | July 20, 1948 |
| 2,488,278 | Findley | Nov. 15, 1949 |
| 2,542,317 | Faulhaber et al. | Feb. 20, 1951 |
| 2,612,829 | Joyce | Oct. 7, 1952 |
| 2,631,517 | Duhn | Mar. 17, 1953 |
| 2,640,407 | Aufiero | June 2, 1953 |
| 2,651,986 | Greig | Sept. 15, 1953 |
| 2,672,294 | Crockett | Mar. 16, 1954 |

FOREIGN PATENTS

| | | |
|---|---|---|
| 995,730 | France | Aug. 22, 1951 |